(12) United States Patent
Brandão et al.

(10) Patent No.: US 12,525,798 B2
(45) Date of Patent: Jan. 13, 2026

(54) PROCESS FOR CONTROLLING ISOLATED MICROGRIDS BASED ON POWER-BASED CONTROL AND MODIFIED Volt-VAr FUNCTION METHODS

(71) Applicants: PETRÓLEO BRASILEIRO S.A.—PETROBRAS, Rio de Janeiro (BR); UNIVERSIDADE FEDERAL DE MINAS GERAIS—UFMG, Belo Horizonte (BR)

(72) Inventors: Danilo Iglesias Brandão, Belo Horizonte (BR); Laís Abrantes Vitoi, Belo Horizonte (BR); João Marcus Soares Callegari, Belo Horizonte (BR); Felipe Silva Oliveira, Belo Horizonte (BR)

(73) Assignees: PETRÓLEO BRASILEIRO S.A.—PETROBRAS, Rio de Janeiro (BR); UNIVERSIDADE FEDERAL DE MINAS GERAIS—UFMG, Belo Horizonte (BR)

( * ) Notice: Subject to any disclaimer, the term of this patent is extended or adjusted under 35 U.S.C. 154(b) by 0 days.

(21) Appl. No.: 18/646,872

(22) Filed: Apr. 26, 2024

(65) Prior Publication Data
US 2024/0405547 A1 Dec. 5, 2024

(30) Foreign Application Priority Data
Jun. 5, 2023 (BR) .......................... 1020230109950

(51) Int. Cl.
*H02J 3/00* (2006.01)
*H02J 3/18* (2006.01)
*H02J 3/48* (2006.01)

(52) U.S. Cl.
CPC ........ *H02J 3/00125* (2020.01); *H02J 3/1892* (2013.01); *H02J 3/48* (2013.01); *H02J 2203/10* (2020.01)

(58) Field of Classification Search
CPC ........ H02J 3/00125; H02J 3/1892; H02J 3/48; H02J 2203/10; H02J 2310/10; H02J 3/381
USPC .......................................................... 307/69
See application file for complete search history.

(56) References Cited

U.S. PATENT DOCUMENTS

2023/0223751 A1* 7/2023 Holcombe ............ H02M 1/322
307/18

* cited by examiner

*Primary Examiner* — Richard Tan
(74) *Attorney, Agent, or Firm* — Kilpatrick Townsend & Stockton LLP

(57) ABSTRACT

A control process for microgrids for voltage regulation on the main bus and power factor (PF) regulation at generator terminals is presented, especially in events scheduled in the microgrid that result in electrical transients, such as direct starting of induction motors (IM). The technology takes advantage of idle capacity of distributed converters (for example: frequency inverters, "variable frequency drive" or VFD) of microgrids making them, in coordinated manner, injecting and/or absorbing reactive power, in addition to exploit the reduced latency of autonomous VFD control during the transient. The Power-Based Control (PBC) technique is used and a modified Volt-VAr function is created applied during the transitional regime.

3 Claims, 5 Drawing Sheets

PROCESS FOR CONTROLLING ISOLATED MICROGRIDS BASED ON POWER-BASED CONTROL AND MODIFIED Volt-VAr FUNCTION METHODS A control process for microgrids for voltage regulation on the main bus and power factor (PF) regulation at generator terminals is presented, especially in events scheduled in the microgrid that result in electrical transients, such as direct starting of induction motors (IM). Technology takes advantage of idle capacity of distributed converters (for example: frequency inverters, "variable frequency drive" or VFD) of microgrids making them, in coordinated manner, injecting and/or absorbing reactive power, in addition to exploit the reduced latency of autonomous VFD control during the transient. The Power-Based Control (PBC) technique is used and a modified Volt-VAr function is created applied during the transitional regime. The advantages of the technology are: (1) voltage and power factor regulation, and (2) mitigation of high current demand of the generators during direct starting from IM. The technology mainly applies to isolated microgrids supplied by synchronous generators and with large loads mostly inductive, like offshore oil platforms.

Isolated microgrids are electrical systems, composed of sources and loads, which are not connected to an interconnected power system. Some examples are: oil platforms, aircraft, ships, isolated communities, among others. There are several microgrid configurations and each one has different characteristics. The present technology has its main application in isolated microgrids supplied by synchronous generators and with large loads mostly inductive. The typical example is offshore oil platforms. In this case, there are normally two to three synchronous generators that supply all the demand of the platform and a few engines (of two to three) represent a consumption in the order of 15 to 30% of the power generated.

For these systems, the operation of generators with a power close to unity is interesting, due to the greater availability of active power supply from these machines. This is particularly important on oil rigs offshore, as the number of generators is limited and the physical space and weight are quite restrictive variables. Another important issue in this scenario is the start of large induction motors. When these are directly driven, the current drawn is very high (from 3 to 6 times greater than the rated current of the motor) and is mostly reactive. This causes a significant voltage drop in the main bus (in the order of 10 to 15%), overloading the field windings (overexcitation) and stator windings of generators.

There is the solution of using electronic converters to drive these large motors, with the benefit of soft starting (lower transient current drained during starting) and reduction of impact on main bus voltage. Furthermore, these converters, known as frequency inverters, variable frequency drive (VFD) or variable speed drive (VSD), decrease the short-circuit current during the occurrence of a fault in the electrical grid.

There are, in the state of the art, some technologies applied to microgrids dedicated to voltage regulation and/or power factor regulation, according to documents presented below.

Coordinated control: is a technique in which all distributed units act to achieve a common objective in a synchronized way, and the decisions of each unit are made based on a remote command (centralized control) that does not conflict with technical and individual limitations of each distributed unit. The coordinated control objective to exploit the idle capacity of the converters, without restrict its main operation and degrade its performance (T. Caldognetto; S. Buso; P. Tenti and D. I. Brandao. "Power-Based Control of Low-Voltage Microgrids," in IEEE Journal of Emerging and Selected Topics in Power Electronics, volume 3, number 4, pages 1056 to 166 December 2015).

This technology proposes a coordinated control process to regulate the reactive power of frequency inverters, in order to control the power factor in steady state at the terminals of the synchronous generators and reduce voltage fluctuation when starting large induction motors.

There are several autonomous and centralized coordination control processes in the state of the art. The process of the present invention is based on autonomous Volt-VAr coordinated control and power-based centralized coordinated control (Power-Based Control or PBC). Volt-VAr is a classic technique widely used for distributed generation, which consists of providing voltage support to the main bus through absorption and/or injection of reactive power by converters.

The amount of reactive power is defined depending on the value of voltage measured at the connection point of the frequency inverter through of a curve called the Volt-VAr curve. The centralized coordinated control PBC is based on the operation of frequency inverters remotely controlled through power commands sent by a central controller. Its main benefit is to regulate the power flow into a main feeder through a link communication that requires low data transmission rate, and does not demand on parameter information and topology of the power system ("IEEE Standard for Interconnection and Interoperability of Distributed Energy Resources with Associated Electric Power Systems Interfaces," in IEEE Std 1547-2018 (Revision of IEEE Std 1547-2003), pages 1 to 138, Apr. 6, 2018).

The patent document U.S. Pat. No. 9,733,623 B2, entitled "MICROGRID ENERGY MANAGEMENT", dated Jul. 31, 2013, shows a method for periodically determining active and reactive power set points for the control of distributed energy resources through the grid voltage values. The power reference update rate proposed is 5 to 15 minutes. Meanwhile, the process proposed in this technology updates in ms, compensating, for example, voltage dip during motor starting. That is possible due to the switching between the operation modes, coordinated and autonomous, which is technically detailed in the present patent application.

Callegari, Pereira and Brandao (2021), in the article titled "Coordinated Volt-VAr Control in Microgrids", show a technology based on the PBC method that provides, in a complementary way, a Volt-VAr function to mitigate voltage variations (tension support) at the PAC (cumom coupling point) and a modified Volt-VAr function that acts locally to mitigate voltage variations acting on the node to which the converter is connected, with the modified Volt-Var function being implemented in the embedded control of each converter. The modified curve has an offset that corresponds to the increase in reactive power to be exchanged with the grid (grid-connected operation) to perform the desired voltage support. The technology in the article by Callegari et al. (2021) applies to connected microgrids (does not apply directly to the case of isolated microgrids) and is dedicated to solving voltage variations in the PAC involving a tertiary level of control, not addressing the regulation of power factor directly, nor is it capable of specifically dealing with events scheduled in the microgrid that result in electrical transients. In contrast, the technology proposed in the present patent application proposes a solution for isolated microgrids and provides voltage regulation on the main bus and regulation of the power factor at the generator terminals.

In view of the above, the new and inventive features of the technology being proposed are highlighted: a control process for isolated microgrids that allows voltage regulation in the main bus and regulation of the power factor at the generator terminals, especially in conditions of scheduled events in the microgrid that result in electrical transients, such as direct starting of induction motors. The technology allows taking advantage of the idle capacity of the distributed converters present in the microgrids making them, in a coordinated manner, injecting and/or absorbing reactive power. Such behavior is achieved through a process based on Power-Based Control (PBC) technique and the design of a modified Volt-VAr function applied during the transitional regime. The advantages of the technology are: voltage and power factor regulation and high current demand mitigation during direct starting of induction motors.

The invention also directly solves the following technical problems:

1) Reduced power factor at synchronous generator terminals. Electric charges in isolated systems have mostly inductive behavior. This makes the power factor in the generator units reaches a value below unity, around 0.8 to 0.9. This means that generators use part of their active power generation capacity (i.e., useful work) to provide reactive power (i.e., necessary for magnetization of induction motors). It is extremely interesting to consider the power factor in generator terminals to a value close to unity, aiming to maximize its active power generation. The invention operates in this problem. The proposed process is capable of controlling the power factor at a desired level through coordinated injection of reactive power by electronic frequency inverters. This allows the power factor to be increased and reduces the load on generators and increase the energy input to the system.

2) High voltage fluctuation during direct starting of induction motors. When driving an induction motor directly, it drains a very high current value (3 to 5 times the nominal value) until the machine reaches its nominal speed. This can require 10 to 30 s, and after reaching the nominal speed the current reduces abruptly. Both events, increase and decrease in current, cause voltage fluctuations on the main bus, which can overload other devices, and even turn off some industrial processes when sensitizing under/overvoltage protections. The invention helps generators in these situations of abrupt variation in current in planned events, such as the starting of a large engine, providing grid support.

3) Voltage reduction along the radial feeder. In a general way the operation of equipment and engines reaches its maximum efficiency when voltage and frequency are at their operation nominal values. Therefore, voltage and frequency deviation mean loss energy for any electrical system. The proposed invention is capable of increasing the voltage value close to the nominal value, contributing to more efficient operation of the system as a whole.

Furthermore, due to the use of frequency inverters, the invention solves other problems such as:

4) Direct starting of induction motors (high current demand). Frequency inverters have a starting function smooth, which avoids high values of current drained at the generator operation. It should be noted that this function applies to the motor driven by the frequency inverter, but it does not solve or change the high current starting of another motor connected to the same bus as previously discussed.

5) High short-circuit current. A typical problem with electrical systems with a large number of induction motors is the high short-circuit current. Induction motors under condition of faults in the electrical grid contribute significantly to the short-circuit current, which can damage equipment and generate hazardous conditions to employees if the protection system is not properly tuned. If the short-circuit current value is high beyond conventional market values, for a protection, this will require dedicated protections that burden excessively the cost of the electrical system. The use of frequency inverters enables galvanic isolation of the driven motor during fault events in the electrical system, so that their contribution to short-circuit current is extinguished. This reduces the level of short-circuit of the electrical system, relieving the protection systems.

DETAILED TECHNOLOGY DESCRIPTION

A control process for microgrids for voltage regulation on the main bus and power factor (PF) regulation at generator terminals is presented, especially in events scheduled in the microgrid that result in electrical transients, such as direct starting of induction motors (IM). Technology takes advantage of idle capacity of distributed converters (for example: frequency inverters "variable frequency drive" or VFD) of microgrids making them, in coordinated manner, injecting and/or absorbing reactive power, in addition to exploit the reduced latency of autonomous VFD control during the transient. The Power-Based Control (PBC) technique is used and a modified Volt-VAr function is created applied during the transitional regime. The advantages of the technology are: (1) voltage and power factor regulation, and (2) mitigation of high current demand of the generators during direct starting from IM.

The process for controlling isolated microgrids based on Power-Based Control (PBC) methods and modified Volt-VAr function comprises the following steps:
 a) identifying the range of power factor (PF) values for the microgrid to be controlled, between the PF*min value and the PF*max value;
 b) in permanent regime, applying the PBC control method via central controller (CC) and defining the PF references to be used for generators to the maximum value PF*max. VFDs inject reactive power according to calculated quantity ($q_{ref}$) via central controller by PBC method;
 c) identifying the moment in which the scheduled transitional regime will start;
 d) moments before the start of the scheduled transitional regime identified in step "c" changing the PF references to be used for generators for their minimum value (PF*min) and programming the VFDs to use the unit as a reference (unitary PF), increasing its availability of reactive power exchange with microgrids within their technically specified limit;
 e) at the start of the programmed transitional regime, the commands from the central controller are suspended and the VFDs begin to define the reactive power exchanged with the grid autonomously in function of the voltage measured at its connection point through the curve modified Volt-VAr, until the transitional regime ends;
 f) after the end of the transitional regime, the condition permanent regime described in step "b" is reestablished: the PBC control method via CC, the PF references to be used for the generators return to the maximum value (PF*max) and the VFD inject reactive power ($q_{ref}$) calculated via DC by the PBC method.

The technology can be better understood by the examples below follow, not limiting.

Example 1—Application of the Process to an Isolated Microgrid (Computer Simulation)

Figure 1:
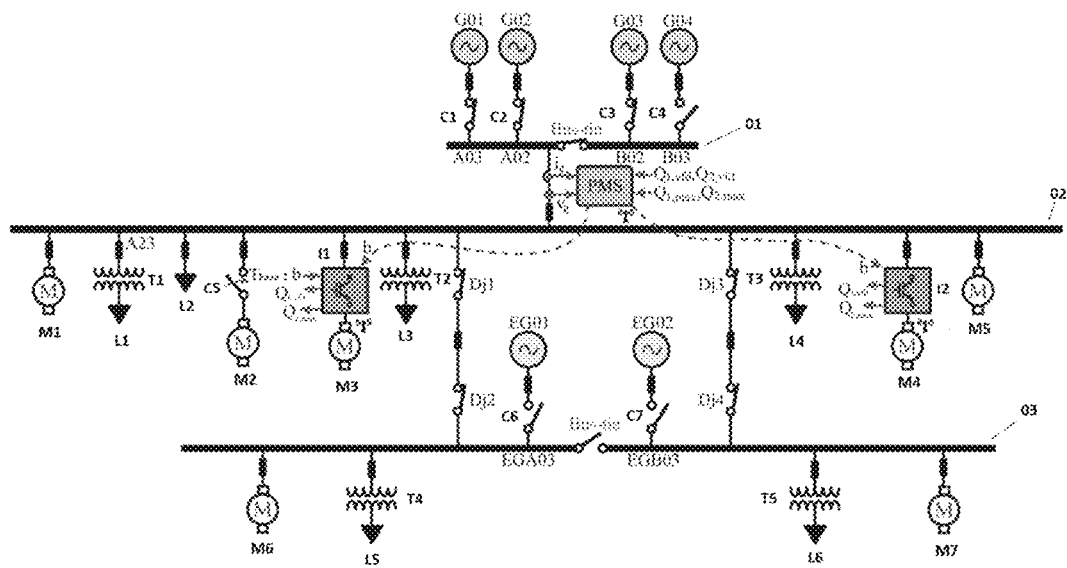
FIG. 1 shows a non-limiting example of an isolated microgrid in which the proposed process was applied through a computer simulation. The microgrid represents a microgrid of an oil platform, in a non-limiting way, and is formed by the generators G01, G02, G03, G04, whose respective keys (C1, C2, C3 and C4) connect them to the main bus (01) respectively in the connection points A03, A02, B02 and B03; and a bus sectioning circuit breaker (Bus-Tie). The Power Management System (PMS) unit is the central controller and receives measurements of voltage and current on the main bus (ug and ig) and receives information from power (output reactive power, Qi,ufd, and maximum reactive power available, Qi,max) of the $i^{th}$ frequency inverter distributed in the electrical grid via a low-bandwidth communication bus. The bus (02) is connected to the main bus (01) and receives connections from the following devices: an aggregate motor (M1), a transformer (T1) connected to a low voltage load (L1), a medium voltage load (L2), a motor (M2) that can be directly connected to the bus (02) through the key (C5), a motor (M3) which can be connected to the bus (02) through a VFD converter (I1) that receives information from the PMS containing the value of the coefficient "b" to be used in calculating the reactive power that must be exchanged with the microgrid and transmits power information (output reactive power, Qi,ufd, and maximum reactive power available, Qi,max, i=1 for this inverter); a transformer (T2) connected to a low voltage load (L3), a circuit breaker Dj1, a circuit breaker Dj3, a transformer (T3) connected to a low voltage load (L4), a motor (M4) which can be connected to the bus (02) through a VFD converter (I2) which receives information from the PMS containing the value of the coefficient "b" to be used in calculating the reactive power that must be exchanged with the microgrid and transmits power information (output reactive power Qi,ufd, and maximum reactive power available, Qi,max, i=2 for this inverter), and an aggregate motor (M5). The bus (02) is connected to the bus (03) which receives connections from the following devices: an aggregate motor (M6), a transformer (T4) connected to a low voltage load (L5), a circuit breaker Dj2, a circuit breaker Dj4, generators EG01 and EG02, the respective keys (C6, C7) of which connect them on the bus (03) respectively at the connection points EGA03 and EGB03 interspersed with a bus sectionalizing circuit breaker (Bus-Tie), a transformer (T5) connected to a low voltage load (L6), an aggregate motor (M7).
Figure 2:
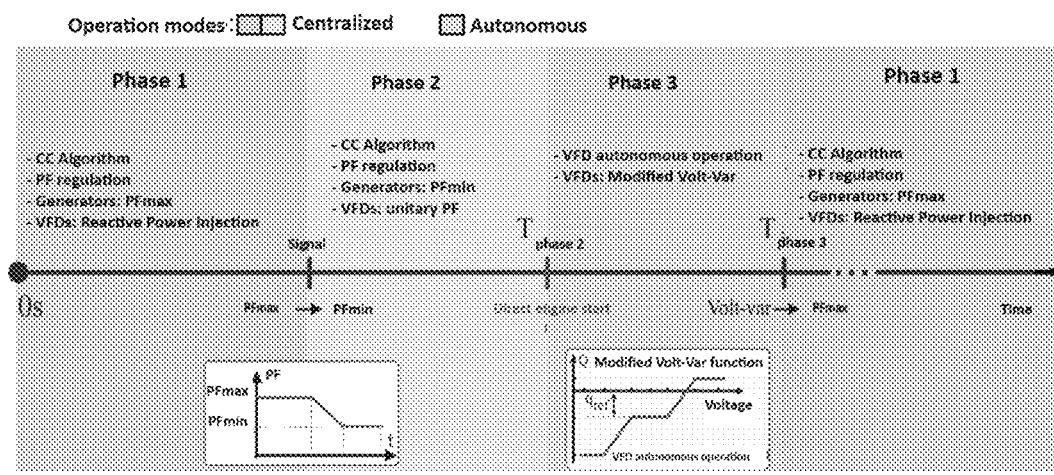
FIG. 2 is a representation of the proposed process divided in three chronologically ordered phases (phase 1, 2 and 3). For each one of the phases, the ways in which the generators, the VFD converters operate, are presented, in terms of the reactive power exchanged in the microgrid and power factor references; the control algorithm applied: Autonomous (in phase 3) or centralized (implemented in the central controller (CC), in phases 1 and 2); and time frames associated with signaling ("Signal" between phases 1 and 2) prior to the programmed load activation (direct starting of induction motor), the driven moment ($T_{phase\ 2}$), the period of duration of the electrical transient generated by the load activation ($T_{phase\ 2}$ to $T_{phase\ 3}$) and the return to the permanent regime (return to phase 1 of the process).

FIG. 1 shows an isolated microgrid in which the control process being proposed is applied in three phases of operation (as shown in FIG. 2). The results showed below refer to a computer simulation. The phases are defined according to the direct starting moment of induction motors without frequency inverters. Phase 2 is initiated when the event planned start of a large motor is signaled to the central controller. Phase 3 consists of the autonomous operation of the electronic converter via modified Volt-VAr curve. The return to phase 1 takes place after pre-defined machine start times, based on dynamics typical of the elements involved (synchronous generator, induction motor and communication channel between the central control and the frequency inverters). FIG. 2 shows the three phases of the process.

Before describing each of the phases, it is important to explain the invention with its control technique-central controller (CC) with modified Volt-VAr. It is noteworthy that the process has two operation modes, autonomous modified Volt-VAr (phase 3) and centralized control (phases 1 and 2).

The modified Volt-VAr control (FIG. 3) is based on the conventional Volt-VAr. It relates the amount of reactive power exchanged between the frequency inverter and the grid with the voltage measured at the point of system connection (FIG. 1, inverters I1 and I2). When the voltage is within the desired limits (dead band of the modified Volt-VAr curve shown in FIG. 3), the frequency inverter provides a fixed reactive power ($q_{ref}$). When the voltage exceeds the limits of the dead band, the exchanged reactive power (capacitive or inductive) increases linearly until reaching a maximum saturation value. This saturation is mandatory in order to guarantee the thermal limits of the frequency inverter. Lastly, it is highlighted that this modified Volt-VAr curve is implemented in the onboard control of each frequency inverter.

Figure 3:
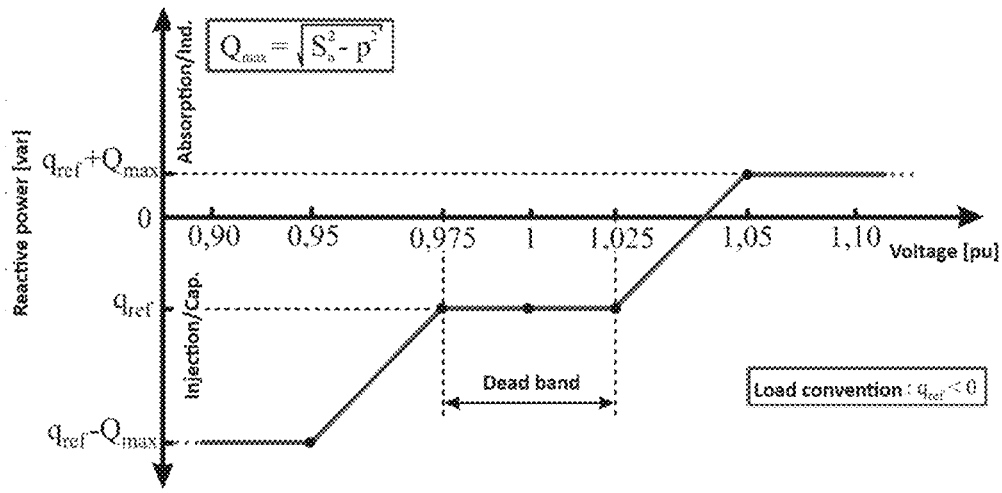
FIG. 3 is a graphic representation of the characteristic curve of the modified Volt-VAr control used in the proposed process.

The voltage limits of the curve are defined according to the grid codes and electrical system recommendations. For example, the dead band limits are those considered acceptable by the grid operator. Reactive power limits are established in accordance with the thermal capacity of the inverter, based on its nominal values. As represented in FIG. 3, the amount of maximum reactive power, Qmax, is a function of the quadratic subtraction between the nominal power of the frequency inverter and the active power drained to drive the electric motor. In this way, the functionality corresponding to reactive power takes on a secondary priority to the engine drive and operation. This guarantees uninterrupted operation conflicting with the technical and individual limitations of each inverter frequency. The value of $q_{ref}$ is set through centralized coordinated control, which is based on the PBC technique, and explained below.

Power-based centralized coordinated control (PBC) consists of the coordination of the converters present in the microgrid to achieve a certain power factor at the generator terminals, in permanent regime. FIG. 4(a) illustrates this technique of control on an offshore oil platform, as a study of case. The PMS block is the central controller that measures voltage and current on the main bus (ug and ig) and receives power information (output reactive power, Qi,ufd, and maximum reactive power available, Qi,max) of the $i^{th}$ frequency inverter distributed in the electrical grid through a communication bus. When measuring and receiving this information, the PMS runs an algorithm (explained in sequence) that returns as output a command coefficient, b. This coefficient is sent to all frequency inverters, that when receiving it, sets the operating $q_{ref}$ reference of the Volt-VAr curve in function of the previous coefficient b and its maximum available capacity, Qi,max. At the end of this process, the control cycle restarts with sending information packages (Qi,ufd and Qi,max) to the PMS, as represented in the flowchart in FIG. 4(b).

It should be noted that the active power of the converters is determined by the motor itself that the frequency inverter is driving, and the active and reactive power are orthogonal to each other and decoupled. In this way, it is guaranteed that cooperative coordinated control does not restrict or degrade the main operation of the frequency inverter, it only exploits their idle capacity.

Figure 4:
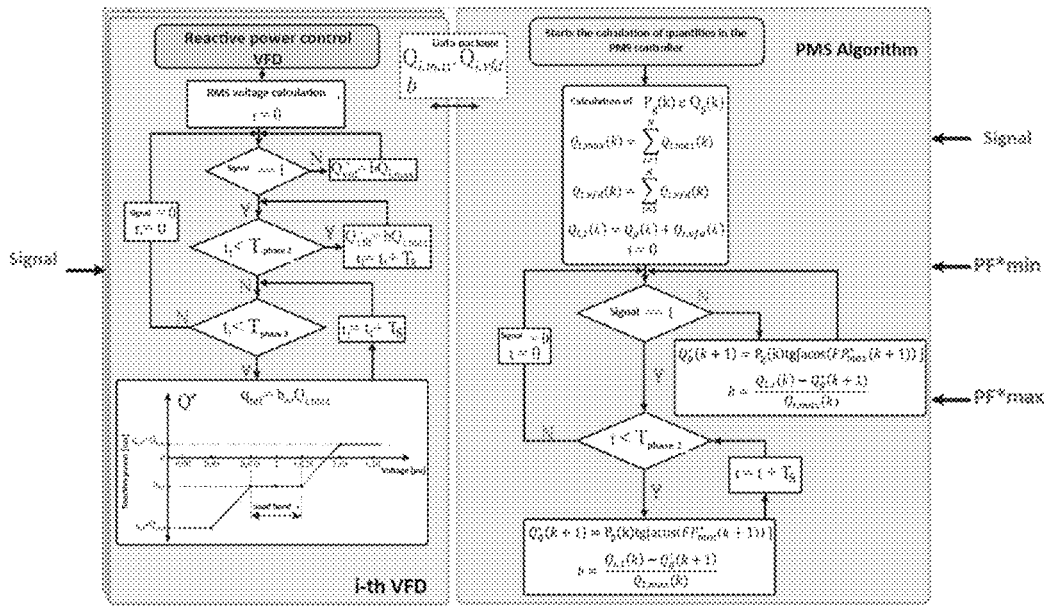
FIG. 4 is a representation of the flowchart of the central controller (CC) algorithm PMS and control embedded in the VFD (modified Volt-Var) in which the calculations of magnitudes involved in the process are explained.

The following describes the algorithm implemented in the PMS that returns the command coefficient, b, as output. The variable k represents the kth control cycle of the PMS controller, and the variable i indicates the $i^{th}$ frequency inverter, which can assume values of 1, 2, . . . , N; where N is the total number of frequency inverters available for the coordinated control. The control algorithm starts with the measurement of voltage and current (ug and ig, as shown in FIG. 4) through the PMS, and the calculation of active and reactive power, calculated by equations (1), (2) and (3).

$$P_g = \frac{1}{T} \cdot \int_{t-T}^{t} (v_g \cdot i_g) d\tau \qquad (1)$$

$$Q_g = \frac{1}{T} \cdot \int_{t-T}^{t} (\hat{v}_g \cdot i_g) d\tau, \qquad (2)$$

$$\hat{v}_g = \omega \cdot \left(v_{g_f} - \overline{v_{g_f}}\right) = \omega \cdot \left(\int_0^t v_g d\tau - \frac{1}{T} \cdot \int_{t-T}^{t} v_{g_f} d\tau\right) \qquad (3)$$

T is the fundamental period of the voltage, and $\hat{u}g$ is the homo-integral of the measured voltage calculated by equation (3), such that $ug\int$ is the integral of ug, $\overline{ug\int}$ is the average value of $ug\int$, and w=2p60 (rad/s) is the angular frequency.

The PMS also receives, through the communication bus, reactive power information, Qi,ufd, and maximum reactive power available, Qi,max of each frequency inverter, and calculates the total reactive power (Qt,ufd) and the total maximum reactive power available (Qt,max) provided by the N frequency inverters during control cycle k, given by equations (4), (5) and (6).

$$Q_{t,fvd}(k) = \sum_{i=1}^{N} Q_{i,vfd}(k), \qquad (4)$$

$$Q_{t,max}(k) = \sum_{i=1}^{N} Q_{i,max}(k), \qquad (5)$$

$$Q_{L,t}(k) = Q_g(k) + Q_{t,vfd}(k), \qquad (6)$$

The total reactive power demanded by the microgrid (QL,t), considering a power exchange with synchronous generators is estimated by equation (6). Once the reactive power demand is estimated in the microgrid, the portion of reactive power that the generators must provide, Qg*, for a given power factor reference configured by the offshore electrical system operator, is determined through equations (7), (8) and (9).

$$Q_g^*(k+1) = P_g(k) tg[acos(FP^*(k+1)), \qquad (7)$$

-continued
$$Q_t^*(k+1) = Q_{L,t}(k) - Q_g^*(k+1), \quad (8)$$

$$b = \frac{Q_{L,t}(k) - Q_g^*(k+1)}{Q_{t,max}(k)} = \frac{Q_t^*(k+1)}{Q_{t,max}(k)}, \quad (9)$$

The portion of reactive power that must be supplied by the frequency inverters, Qt*, in the next control cycle (k+1) is given by equation (8). Note that the operation of the next cycle (k+1) is based in estimates in control cycle k. Furthermore, a closed feedback by the communication channel between the central control and the frequency inverters compensate for possible measurement deviations and line losses. Finally, the algorithm ends with the calculation of the command coefficient, b, calculated by equation (9), where b is the reactive power command sent to frequency inverters that will be locally multiplied by Qi,max to define the reference reactive power to be exchanged with the electrical system, $q_{ref}$.

$$q_{ref} = b \times Q_{i,max}. \quad (10)$$

Note that the value of b is limited to [−1,1] which guarantees that the thermal limits of the inverters are not exceeded. Furthermore, b can take on positive and negative values, which represent capacitive and inductive reactive exchange with the electrical grid.

Finally, it is highlighted that the stability of centralized coordinated control is guaranteed if the processing time of the algorithm and sending the command coefficient does not exceed the time of a control cycle, which is limited by communication technology used. In other words, sending the coefficient b is limited by the dynamics of the communication system employed. Having clear how the control technique acts, each of the phases of the process, and the two operation modes of coordinated control (autonomous modified Volt-VAr and coordinated control). Details below the three phases of the process represented in FIG. 2.

Phase 1 (operation mode with centralized control—maximize power factor): Phase 1 corresponds to the permanent regime operation mode called centralized control. In this operation mode, the reference power factor is set to its maximum value (close to unity). This must be defined by a higher management system, tertiary level of control, based in different methods. In this way, during the permanent regime of the system, the load on the generators is minimized and the input active power energy is maximized.

Phase 2 (operation mode with centralized control—PF reduced): This phase of the process marks the transition between the Centralized control operation to autonomous modified Volt-VAr operation mode. This phase begins with signaling to the central controller that a planned event (e.g., departure of a large motor) will happen, through the variable Signal in FIG. 2. In this moment, the power factor reference, PF*max, is changed to a lower value, PF*min, typically between 0.9 and 0.95. This value is defined according to the characteristics of the microgrid. This phase exists to that the action of the converter in reducing voltage sags during engine starting is more effective. This, therefore, reduces the power factor reference of frequency inverters operate with greater availability of Qi,max, allowing better voltage support at the main bus.

Phase 3 (autonomous operating mode with Volt-Var modified): Phase 3 represents the autonomous modified Volt-VAr operation mode used during engine starting. In this operation mode, the frequency inverters no longer follow commands of the central controller and start to define the reactive power exchanged with the grid depending on the voltage measured at its connection point, as FIG. 4. This change is necessary for the converter to act instantly on the main bus without intrinsic latencies of the communication channel. In this way, during engine starting, the converter exchanges reactive power according to the modified Volt-VAr curve. The duration of this phase is pre-defined and varies according to the characteristics of the loads (i.e., motors) of the system. At the end of this phase, the process returns to phase 1, steady state operation, if no other planned events occur subsequently.

Example 2—Application of the Process on an Offshore Oil Platform

Figure 5:
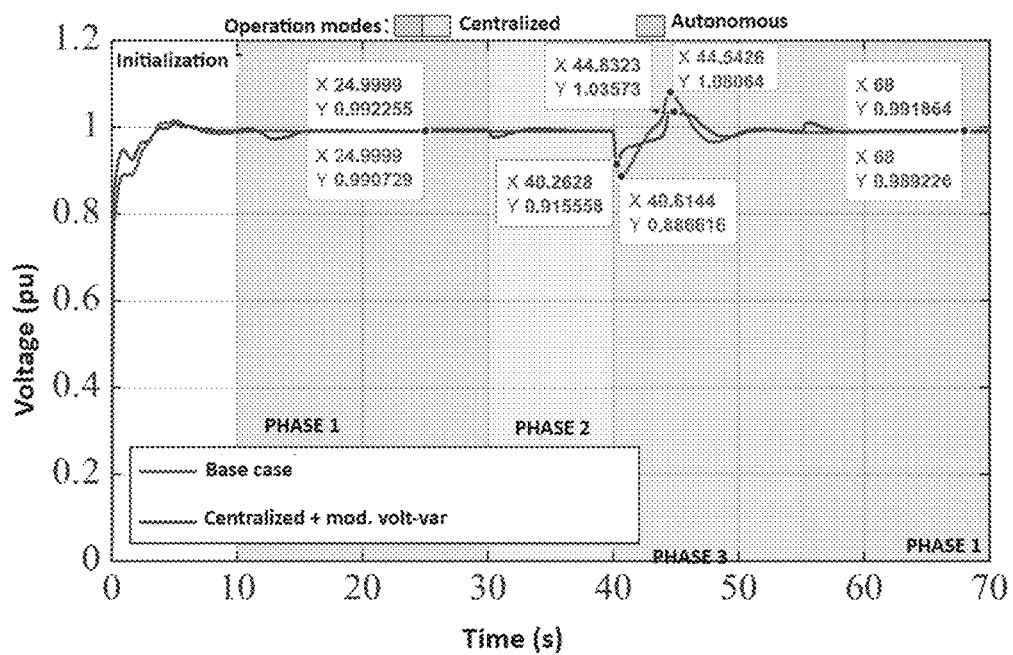
FIG. 5 is a graphic representation of the voltage curve in the main bus as a function of time with indication of the three phases of the process that were described in FIG. 2. The graph has two lines that refer to the base case (microgrid without VFD converters) and the control proposed in the present patent application (centralized combined with modified Volt-VAr), respectively associated with the line colors blue and magenta.

For the purpose of illustrating the process, an example of application on an offshore oil platform is presented. A microgrid used is shown in FIG. 1 and will be compared with the platform results without any frequency inverter (base case). FIG. 5 shows the voltage profile on the main bus. The invention, in addition to increasing the voltage in regime, also reduces the oscillations at the moment the machine starts when compared to the case without converters.

Figure 6:
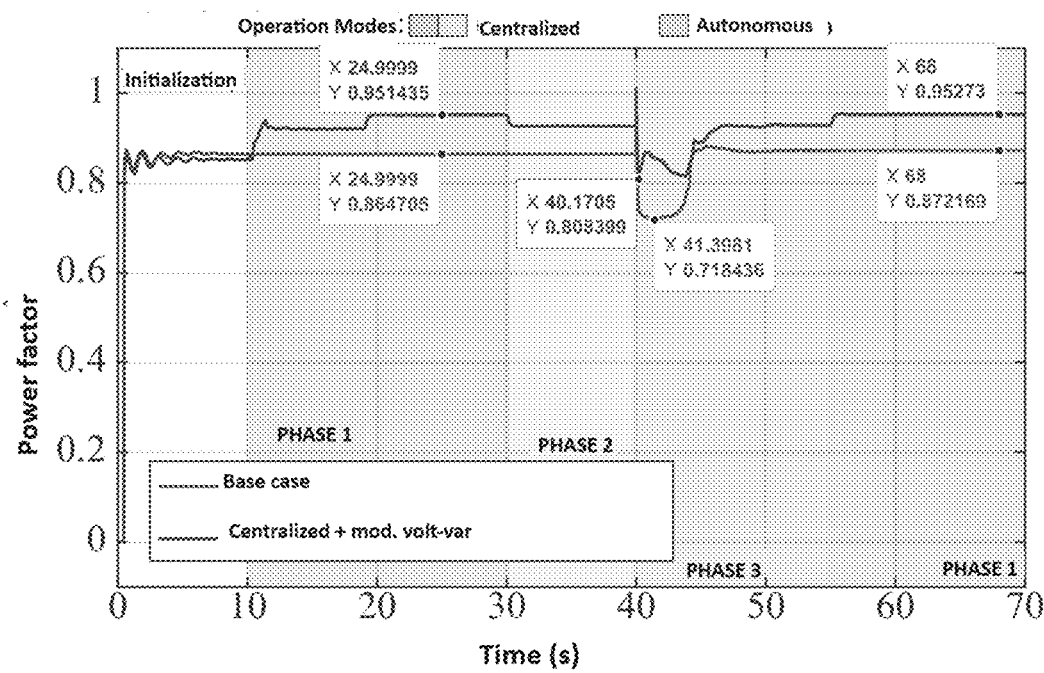
FIG. 6 is a graphic representation of the power factor curve at the terminals of synchronous generators as a function of time with an indication of the three phases of the process that were described in FIG. 2. The graph has two lines that refer to the base case (microgrid without VFD converters) and the control proposed in the present patent application (centralized combined with modified Volt-VAr), respectively associated with the line colors blue and magenta.

FIG. 6 shows the power factor at the terminals of the synchronous generators. Note that centralized coordinated control is capable of regulating the power factor in steady state to the pre-defined value (0.95 in this case), that is, the power factor goes from 0.87 to 0.95. This increase in power factor reduces the power reactive capacity of each generator from 15.52 MVAr to 7.93 MVAr, which implies in a reduction in generator load from 0.8834 to 0.7930, representing an energy increase of 10%.

Example 3—Individual Comparison Between Conventional PBC and Volt-Var Techniques and the Proposed Technology Via Computational Simulation Results There are two technologies in the state of the art, which are the Power-Based Control (PBC) and conventional Volt-VAr. Both are explained and compared with the proposed process.

Advantages of the proposed technology compared to the PBC technique: Although the strategy centralized in a central controller (CC) is capable of regulating the power factor at the output terminals of the synchronous generators and provide voltage support, latency and delay intrinsic characteristics of the communication channel delay the action of the converter during scheduled starting of an induction machine. The main advantage of the proposed process in relation to the control strategy proposal essentially consists of the transition from the centralized mode to autonomous mode. In this case, programmed transient voltage regulation becomes more efficient for the proposed process due to the shorter response time of the autonomous converter (power control loops typically operate with a cutoff frequency of tens of Hz) and momentary independence of the communication channel (slow response, in the order of seconds).

Figure 7:
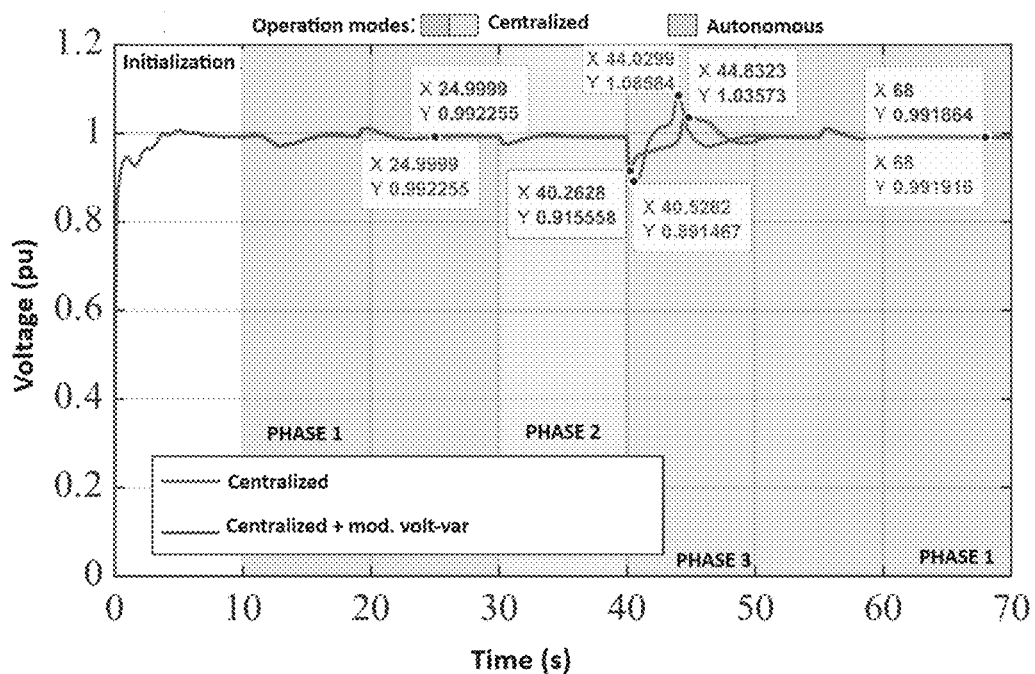
FIG. 7 is a graphic representation of the voltage curve in the main bus as a function of time with indication of the three phases of the process that were described in FIG. 2. The graph has two lines that refer to the application of only the central controller (CC) and the control proposed in the present patent application (centralized combined with modified Volt-VAr), respectively associated with the line colors red and magenta.
Figure 8:
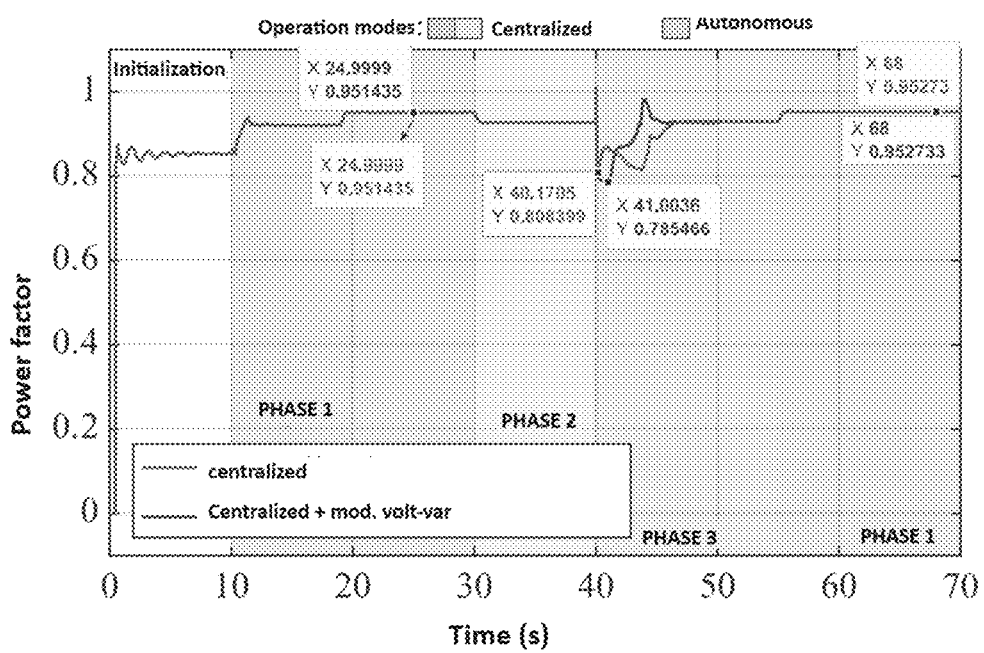
FIG. 8 is a graphic representation of the power factor curve at the terminals of synchronous generators as a function of time with an indication of the three phases of the process that were described in FIG. 2. The graph has two lines that refer to the application only from the central controller (CC) and the control proposed in the present patent application (centralized combined with modified Volt-VAr), respectively associated with the line colors red and magenta.

In order to visualize these benefits, a simulation comparing the two cases was carried out. FIG. 7 shows the voltage in the main bus and FIG. 8 shows the power factor in the generators. As can be seen, in a permanent regime, the two control techniques present similar results. However, the proposed process is capable of minimizing overvoltages and undervoltages transients in the main bus voltage resulting from starting direct from a three-phase induction motor.

Figure 9:
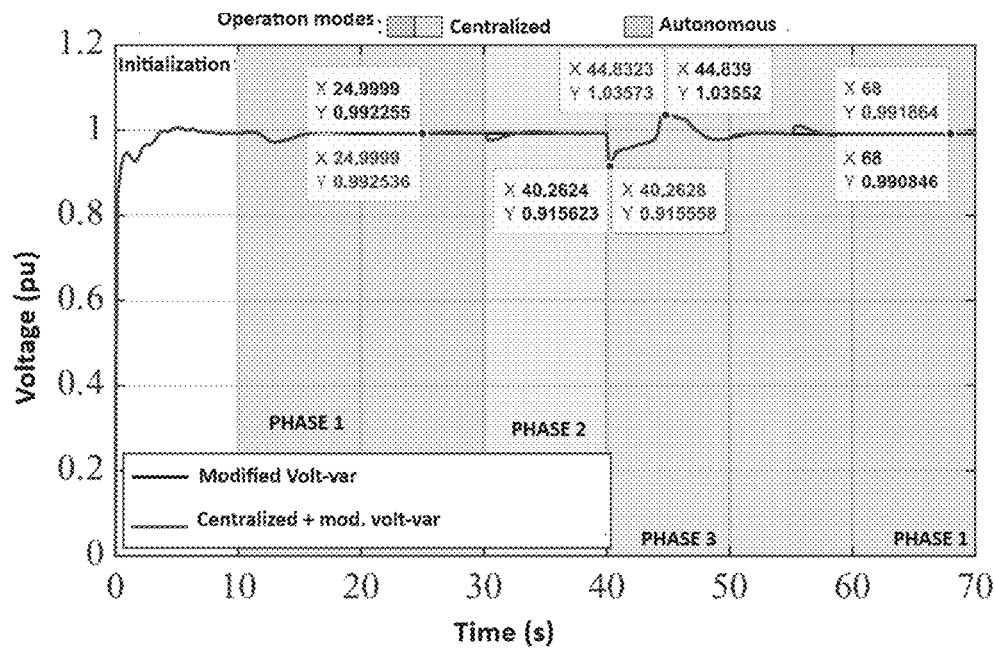
FIG. 9 is a graphic representation of the voltage curve in the main bus as a function of time with indication of the three phases of the process that were described in FIG. 2. The graph has two lines that refer to the application of only the classic Volt-VAr control and the control proposed in the present patent application (centralized combined with modified Volt-VAr), respectively associated with line colors black and magenta.
Figure 10:
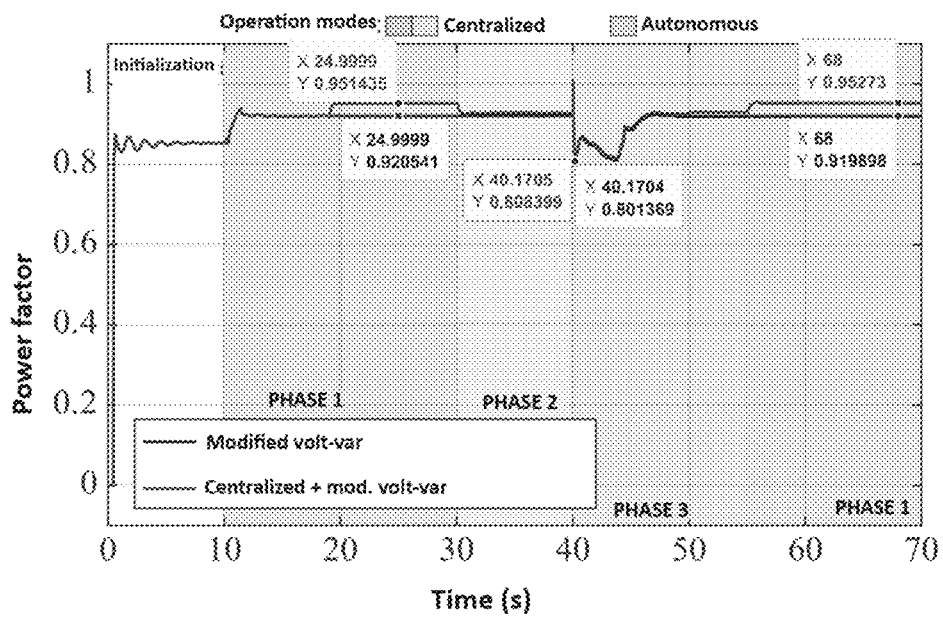
FIG. 10 is a graphic representation of the power factor curve at the terminals of synchronous generators as a function of time with an indication of the three phases of the process that were described in FIG. 2. The graph has two lines that refer to the application only the classic Volt-VAr control and the control proposed in the present patent application (centralized combined with modified Volt-VAr), respectively associated with the line colors black and magenta.

Advantages of the proposed technology in relation to the conventional Volt-Var technique: The proposed process is superior to conventional Volt-VAr technology for electrical systems with large number of inductive loads. The proposed process raises the profile of voltage even under steady state operating conditions with voltage within acceptable limits, which does not happen with conventional Volt-Var. To exemplify these advantages, a simulation comparing the two cases was carried out. FIG. 9 and FIG. 10 present the voltage on the main bus and power factor on the generators where the aforementioned advantages can be visualized. When activating the conventional Volt-VAr still in phase 1, the synchronous generators operate with a power factor of 0.92 in steady state. For the process proposed, the generators operate with configurable power factor (in this case, 0.95) in steady state, which indicates an energy input to the electrical system in relation to the conventional Volt-VAr strategy. In contrast, both strategies contribute significantly to support voltage in a programmed transient regime, since the process proposed also operates in autonomous mode with the Volt-VAr curve.

The invention claimed is:

1. A process for controlling isolated microgrids based on Power-Based Control (PBC) method and modified Volt-Var function method, the process comprising:
   a) identifying, for a microgrid to be controlled, a range of power factor (PF) values between a minimum value (PF*min) and a maximum value (PF*max);
   b) in steady state:
      applying the PBC method via a central controller (CC); and
      defining PF references to be used for generators for the maximum value (PF*max) to control frequency inverters to inject a reactive power calculated via the CC using the PBC method;
   c) before a transitional regime starts:
      changing the PF references to be used for the generators to the minimum value (PF*min); and
      programming the frequency inverters to use a unitary PF as a reference such that the frequency inverters include an increase in availability of reactive power exchange with the microgrid within a technically specified limit of the frequency inverters;
   d) during the transitional regime:
      suspend the CC from applying the PBC method; and
      start the frequency inverters to define the reactive power exchanged with the microgrid based at least in part on a voltage measured at a connection point of the frequency inverters using a modified Volt-Var curve;
   e) after the transitional regime:
      resuming the PBC method via the CC;
      returning the PF references to be used for the generators to the maximum value (PF*max); and
      injecting, by the frequency inverters, the calculated reactive power.

2. The process of claim 1, wherein starting the frequency inverters includes autonomously starting the frequency inverters.

3. The process of claim 1, wherein suspending the CC and starting the frequency inverters includes suspending the CC and starting the frequency inverters from a start of the transitional regime until the transitional regime ends.

* * * * *